INVENTOR.
J. A. DOVICHAK

United States Patent Office 3,525,204
Patented Aug. 25, 1970

3,525,204
STRIPPER ATTACHMENT FOR FLOATING AUGER
Joseph Andrew Dovichak, Tilley, Alberta, Canada, assignor to Deere & Company, Moline, Ill., a corporation of Delaware
Filed Nov. 28, 1967, Ser. No. 686,054
Int. Cl. A01d 89/00
U.S. Cl. 56—364                                       2 Claims

ABSTRACT OF THE DISCLOSURE

A pull-type pickup baler having a fore-and-aft bale case, a pickup device laterally offset from the bale case, a transverse, cantilever mounted, floating-type auger behind the pickup device for receiving crops therefrom and shifting the crop laterally toward the bale case feed opening, and a cantilevered auger stripper bar extending parallel to and above the auger at the auger periphery and connected to the auger for floating movement therewith.

BACKGROUND OF THE INVENTION

This invention relates to an attachment for a floating auger on an agricultural machine, such as a bale chamber feed auger on a pickup-type baler.

Such floating-type augers have been used for a considerable period on pickup balers to feed the crop to the feed opening in the bale case, the original U.S. patents disclosing such floating-type baler feed augers now being expired. Conventionally, such floating augers are transversely disposed behind the crop pickup mechanism, receiving the crop therefrom and moving it laterally along a horizontal floor toward a feed opening in the bale case. The augers have been supported in cantilevered fashion at their remote end from the feed opening, so that the auger support does not interfere with the movement of crop from the remote or intake end of the auger toward the discharge end of the auger adjacent the feed opening. Such augers are also free to float upwardly to vary the spacing between the auger and the floor according to the thickness of the mat of material being moved by the auger across the floor, most of the material being moved beneath the center line of the auger.

However, in some crops and in certain conditions there has been a tendency for the crop to ride upwardly in a direction of auger rotation and wrap itself around the auger, interfering with the proper feeding of the crop material to the bale case. For example, in alfalfa hay, which is a widely grown crop, when the hay is somewhat damp, it tends to wrap around the auger. Of course, it is known to provide auger strippers to prevent material from wrapping around the auger in many conveying devices. However, such strippers are conventionally fixed, and are associated with axially fixed augers, such fixed augers and strippers being previously utilized on certain balers. Such strippers, however, cannot be used with floating augers since, if they are sufficiently close to the auger in the lower position of the auger to operate satisfactorily, they would interfere with the upward floating movement of the auger.

SUMMARY OF THE INVENTION

According to the present invention, a floating stripper is provided along the upper periphery of the floating auger for floating movement therewith to prevent wrapping of the crop around the auger regardless of the vertical position of the auger. Other features of the invention reside in the simple, rugged, and inexpensive construction of the stripper and the means for mounting it for floating movement with the auger. Still another feature of the invention is the fact that the auger stripper can be provided as an optional attachment for new machines or easily added to machines already in the field.

DESCRIPTION OF THE PREFERRED EMBODIMENT

Figure 1:
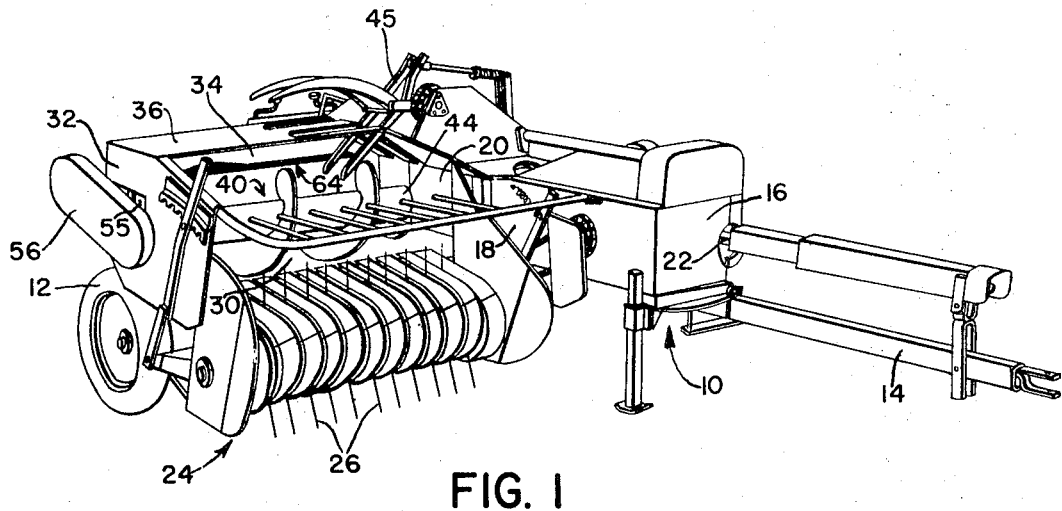
FIG. 1 is a right front perspective view of a representative pickup baler embodying the present invention.
Figure 2:
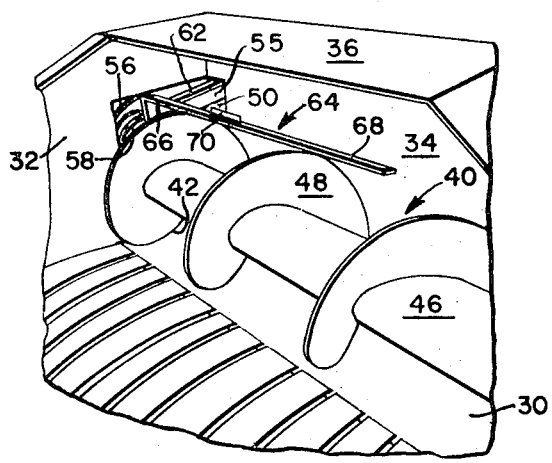
FIG. 2 is a fragmentary left front perspective of the feed auger and its associated stripper according to the present invention.
Figure 3:
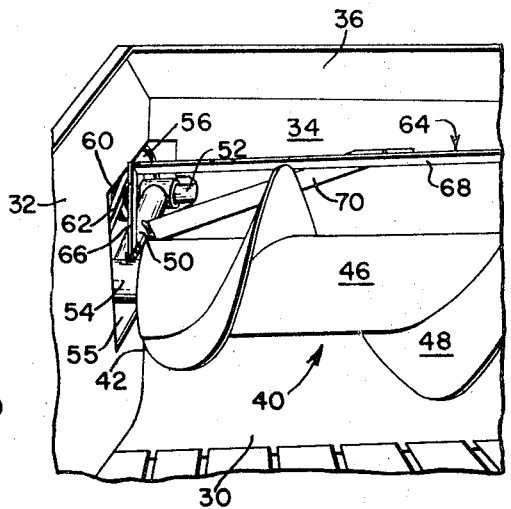
FIG. 3 is a front perspective of the mounted end of the auger and the stripper.

The baler chosen for purpose of illustrating the invention is of conventional construction and comprises a mobile main frame 10 mounted on a pair of support wheels 12 to advance over a field of previously harvested and windrowed crops, only one of the support wheels being shown in FIG. 1. The main frame 10 is connectible to a towing vehicle, conventionally an agricultural tractor, via a fore-and-aft extending draft member 14 at the left side of the machine. It is to be understood that the terms "right," "left," "fore-and-aft," "transverse," etc. are with reference to a person facing the direction of machine travel and that such terms are used to more clearly define the invention and not as limiting terms.

An elongated, fore-and-aft extending bale case 16 is mounted on the main frame and includes an upright, fore-and-aft extending side wall 18, which is formed with a generally rectangular feed opening 20. A plunger, not shown, reciprocates in the bale case in the conventional manner to compress the crops fed through the feed opening, the plunger, as well as the other driven baler components, being driven through a conventional drive train connectible to and drivable by the tractor power take-off mechanism through a fore-and-aft drive shaft 22.

Laterally offset to the right of the bale case 16 is a conventional crop pickup device, indicated in its entirety by the numeral 24, mounted for vertical floating adjustment on the main frame and including a plurality of rotating teeth 26, which pick up the crop windrow as the machine advances and move it upwardly and rearwardly onto a horizontal crop-receiving floor 30, mounted on the main frame 10 and extending laterally outwardly from the lower edge of the feed opening to an upright fore-and-aft outer wall 32 attached to the main frame. The rearward portion of the floor 30 curves upwardly, forming a generally upright rear wall 34, which extends between the outer wall 32 and the side wall 18 of the bale case. A hood 36 partially overlies the floor and also extends between the outer wall and bale case side wall.

A floating cantilever-mounted auger, indicated generally by the numeral 40, extends transversely above the floor 30 between the outer wall 32 and the feed opening 20 for moving crops along the floor toward the feed opening, the auger 40 having an intake or journaled end 46 adjacent the outer wall 32 and a discharge or free end 44 opposite the feed opening 20. A reciprocating finger-type feed mechanism 45 is associated with the discharge end of the auger 40 to move the crop material from the discharge end, through the feed opening 20 and into the bale case 16.

The auger includes an axial tube 46 having a relatively short drive shaft (not shown) at its intake end and a helical flight 48 of conventional construction. The auger 40 is mounted for vertical floating adjustment on a generally fore-and-aft extending arm 50 pivotally mounted on a transverse drive shaft 52 behind the rear wall 34. The forward end of the arm 50 forms a cylindrical journal 54 which rotatably receives the shaft at the end of the auger tube, the auger being mounted on the arm through an opening 55 in the outer wall.

The auger is rotated by the rear drive shaft 56 through a typical belt drive operating under a shield 56, the drive including a pulley 58 attached to the auger shaft, a pulley 60 attached to the shaft 52, and a belt 62 drivingly connecting the pulley 58 to the pulley 60.

An auger stripper, indicated generally by the numeral 64, is associated with the auger 40 and prevents the crop material from moving over the auger as the auger rotates, so that the crop material does not wrap around the auger. The auger stripper 64 floats with the auger and includes a generally vertical support arm 66 rigidly secured to the forward end of the arm 50 and extending upwardly therefrom, the arm 66 being adjacent the inside of the outer wall 32 and moving relative thereto as the arm 50 swings in a vertical arc about its rearward pivot. Rigidly secured to and extending laterally inwardly from the upper end of the arm 66 is a horizontal stripper bar or arm 68, the stripper bar 68 being disposed adjacent the auger periphery and extending from the intake end of the auger to a relatively short distance from the discharge or free end of the auger. A diagonal brace 70 extends downwardly laterally and rearwardly from a central portion of the horizontal stripper bar 68 to a central portion of the arm 50, the opposite ends of the brace 70 being rigidly attached by welding or the like to the respective arms to rigidly maintain the arm or bar 68 in a fixed position relative to the arm 50.

In operation, as previously described, the pickup device 24 elevates the windrowed crop from the field to the floor 30 and the auger 40 shifts the crop lying on the floor 30 laterally toward the feed opening 20, the feed mechanism 45 moving the crop from the free or discharge end 44 of the auger into the bale case 16. As also previously described, the auger 40 is supported at only one end, which is mounted on the arm 50 for free floating vertical adjustment about the axis of the shaft 52. The stripper bar 68 is mounted at the auger periphery generally parallel to and above the axis of the auger, and since it is also mounted only on the arm 50, its relationship to the periphery of the auger does not change, regardless of the vertical adjustment of the auger. The stripper bar 68 strips the crop material from the auger periphery as the auger rotates, to prevent movement of the crop over the auger. It has been found that this arrangement has eliminated wrappage of the crop around the auger, regardless of the crop conditions. As is apparent from the above, the auger stripper 64 is of simple construction, and can easily be added to machines already in the field by welding or similarly attaching the vertical arm 66 and the diagonal brace 70 to the auger support arm 50.

I claim:

1. In a harvester having a mobile frame, a horizontal crop-receiving floor mounted on the frame and having opposite lateral sides, a crop harvesting means for depositing crops on the floor, a rotatable auger disposed above the floor for moving crops thereon and including an intake end and a discharge end, and auger mounting means mounted for vertical adjustment relative to the floor and connected to the intake end of the auger for mounting the auger in cantilever fashion on the frame for vertical floating adjustment relative to the floor, the improvement comprising: an auger stripping means mounted on the auger mounting means for floating movement therewith in response to floating movement of said auger and including an elongated bar disposed parallel to and above the auger axis adjacent the auger periphery and adapted to prevent material at the auger periphery from moving over the auger in the direction of auger rotation.

2. The invention defined in claim 1 wherein the auger mounting means includes a generally fore-and-aft extending arm having its rearward end connected to the frame via a transverse pivot for rocking of the arm in a vertical arc and having a journal means at its forward end in which the intake end of the auger is journaled and the auger stripping means includes a generally upwardly extending support member attached to the forward end of said arm and the auger stripper bar is attached to and extends transversely from the upper end of the support member in cantilever fashion.

References Cited

UNITED STATES PATENTS

| | | | |
|---|---|---|---|
| 2,245,997 | 6/1941 | Olson | 198—213 |
| 2,775,089 | 12/1956 | Russell | 56—341 |
| 3,209,898 | 10/1965 | Beebe et al. | 198—213 |
| 3,367,094 | 2/1968 | Harwig | 56—364 |

LOUIS G. MANCENE, Primary Examiner

J. A. OLIFF, Assistant Examiner